Figure 1:
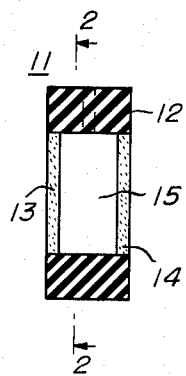

June 7, 1966    KEITA YAMAMOTO    3,255,391
ELECTROCHEMICAL APPARATUS

Filed Nov. 24, 1961    3 Sheets-Sheet 1

$Log f : f = 1/T_s$

United States Patent Office 3,255,391
Patented June 7, 1966

1

3,255,391
ELECTROCHEMICAL APPARATUS
Keita Yamamoto, 5-110 Kodanjutaku, 571 Nishidacho-1-chome, Suginami-ku, Tokyo, Japan
Filed Nov. 24, 1961, Ser. No. 154,749
Claims priority, application Japan, Nov. 25, 1960, 35/46,872; Oct. 31, 1961, 36/38,861
19 Claims. (Cl. 317—231)

This invention relates to an electrochemical oscillator, and particularly this invention is concerned with an apparatus generating self-exciting oscillation based on chemical reactions.

The self-exciting oscillation produced by an apparatus of the present invention is fundamentally different in principle from that which is generated by means of the Dynatron type resistor elements heretofore known. This invention is useful not only for oscillation in electrical circuits, but also for controlling temperatures or pressures as well as detection or identification of certain materials. In the U.S.A., an element which utilizes an electrochemical reaction has been developed and sold under the trade name of "SOLION," and in each element, rectification and modulation are effected based on the difference between the diffusion velocities of positive and negative ions at metal electrodes. This prior element, however, is somewhat limited in practice for it is useful only at a frequency of less than 50 cycles and at an electric voltage of less than 1 volt.

The present invention resides in the oscillation device which comprises the junction connecting between any two members selected from an acid region provided by doping an acid or proton donor into a medium comprising a neutral compound, such as water, alcohols, aldehydes, etc., a basic region provided by doping a base or proton acceptor into another medium and a neutral region, the said neutral compound being capable of forming hydrogen bond and of conducting the transfer of two species, namely proton and proton-defect carrier in the molecule—for example, proton and hydroxyl ion in case of water and proton and alkoxyl-ion in case of alcohols—and the said junction being impressed with an electric field. The above-said acid region is a conductor of the proton excess type in which protons principally take a part, and the above-said basic region is a conductor of the proton excess type in which proton defect carrier ions principally take a part. Whereas, the neutral region which is different from the acid and basic regions is such a region that both positive and negative ions—not restricted to protons and proton defect carrier ions—commonly provide ion transfer therein.

When other positive ions than a molecule constituting the neutral medium are junctured to the acid region, oscillation will occur accompanied to dissipation of protons from the hydration shell or in the course of destruction and reformation of the hydration shell. When other negative ions are junctured to the basic region, oscillation similarly occurs. This also is perturbation of wave equation with respect to protons. In the junction comprising an acid region, a suitable boundary region and a basic region in series, when impressed with an electric field, exhibits proton transfer through hydrogen bonds at individual junctured parts so as to effect non-linear conductance. In the present invention, oscillation is effected by such non-linear conductance.

2

It is accordingly one object of the present invention to provide an electrical oscillating device which utilizes chemical reaction. Another object of the present invention is to provide an apparatus for detecting unknown substance by using the said oscillating device. Still another object of the present invention is to provide an apparatus which is helpful to effect qualitative and quantitative chemical analysis. Other objects, features, capabilities and advantages as comprehended by the present invention will be apparent from the specification and claims which follow.

Figure 3:
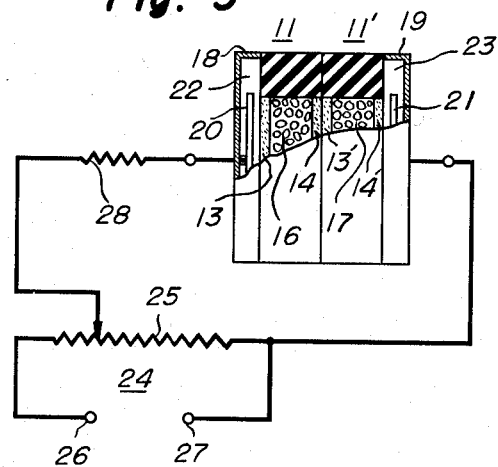
Figure 2:
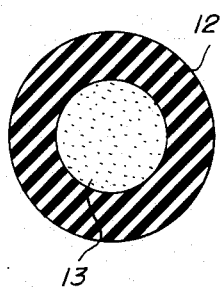
Figure 9:
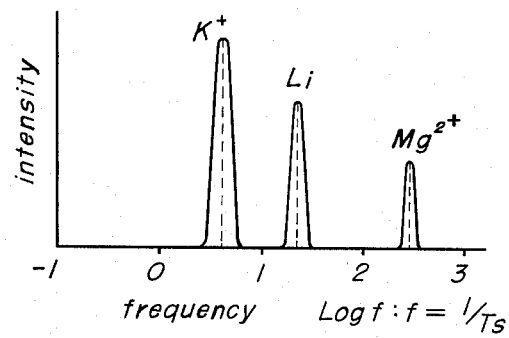
Figure 11:
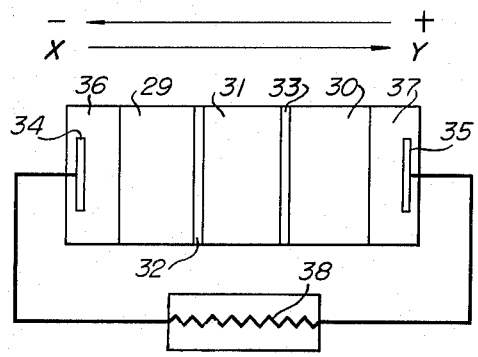
Figure 4:
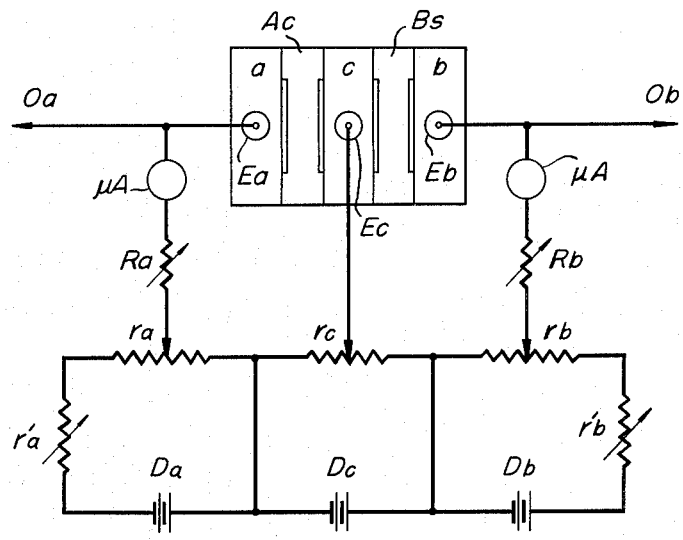
Figure 5:
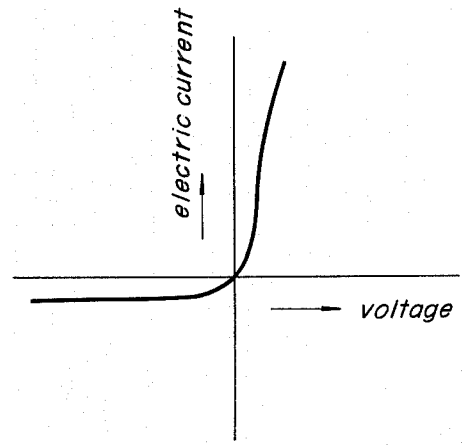
Figure 6:
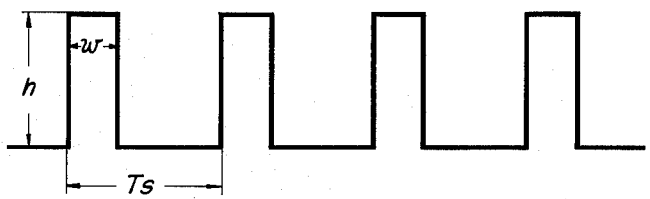
Figure 7:
Figure 8:
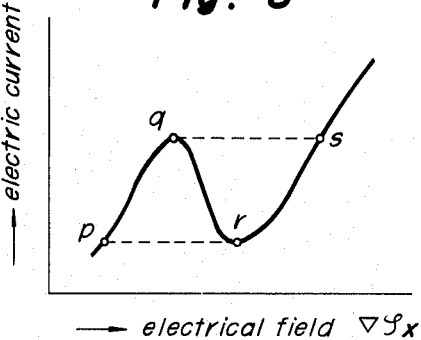
Figure 10:
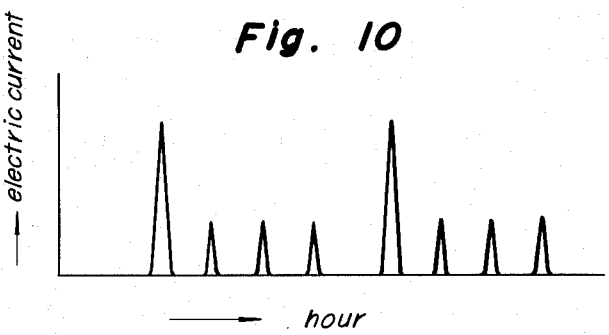

In the drawings attached hereto, FIG. 1 shows the longitudinal cross section showing one concrete embodiment of a vessel used as the acid region, basic region and neutral region of the present invention; FIG. 2 is an elevation of the vessel of FIG. 1, taking away a part along the line 2—2; FIG. 3 is a circuit diagram with reference to one example of the present invention, FIG. 4 is a circuit diagram showing the performance of another example of the present invention, FIG. 5 is a curve showing the non-linear rectification performance between electric voltage and electric current in self-exciting oscillation of the present invention; FIG. 6 is a pulsation curve of relaxation oscillation in still another example of the present invention; FIG. 7 also is a pulsation curve of relaxation oscillation in a further example of the present invention; FIG. 8 is a curve showing the relation between electric field and electric current to explain oscillation output of the present invention with reference to apparent negative resistance; FIG. 9 shows the distribution of intensities of positive ions of three species which are obtained in an apparatus of the present invention; FIG. 10 is a pulse oscillation curve of a binary system; and FIG. 11 shows the circuit design of an oscillation device of the electric resource-holding type.

One of typical acid regions defined hereinabove is provided as the combination of water molecules with the crosslinked polymer of polystyrenesulfonic acid, the latter being known as ion-exchanger. This combination can be illustrated by the following formula:

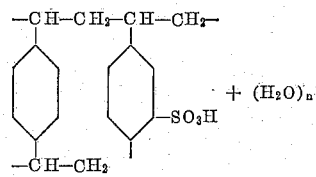

The reason why the crosslinked polymer is used is that such polymer is not suffered from dissolution of a high molecular electrolyte which will flow away to inhibit its transfer. Therefore, even a simple polymer may be suitable for the intended purpose of the invention, as long as this polymer does not provide untransferable negative ion because of its being so giantic as compared with proton.

Other high molecular acids which are suitable as proton donor are the crosslinked polymers of polymethacrylic acid, polyvinyl toluenesulfonic acid, etc., and as liquid proton donor there are dodecyl phosphoric acid (DDPA), diethyl hexyl phosphoric acid (DEHPA), tri-n-butyl phosphate (TBP), etc. Such liquid materials because of their oilish nature can not dissolve in water or the like, and they readily separate from water or the like so as to form a boundary layer. In regard to those which have insufficient connection with water molecules, methanol, ethanol or the like alcohol, or ether is jointly used with water.

Typical bases which are suitable as the proton acceptor constituting a basic region include the crosslinked polymers of polystyrene trimethyl amine, polystyrene polyamine, phenol formaldehyde polyamine, etc. These are known as ion-exchangers having been crosslinked with a crosslinking agent, e.g. divinyl benzene or the like. These materials have the following active groups:

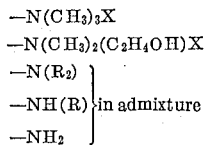

wherein X is hydroxyl group and R is alkyl group. Other modified groups connect with water molecule to provide the following structural form:

As liquid proton acceptor there are Amberlite LA-2 (n-dodecenyl trialkyl methylamine), and Primene JMT, LA-1 and XE-204, all of which are registered trade names. These are liquid oil-miscible ion exchangers which may be used alone or together with an alcohol or ether to connect directly with water molecule.

Those proton donors and proton acceptors as mentioned hereinabove are ion exchangers having a giant molecular structure, and in the present invention, they are fixed in such inmovable state that association and dissociation of small positive or negative ion thereto is effected. Accordingly such a material, the positive ion and negative ion of which has a great difference in ion mobility, may be usable for the present invention. For example, non-ion exchangeable capric acid or caprinic amine, solid inorganic acids, the hydrates of bases, and ice doped with inorganic acid or base can be applied similarly. In connection with other inorganic ion exchangers, powdered crystalline aluminosilicate which is publicly known as Zeolite is also usable as a constituent of an acid region. Ion exchangers of the two cationic type are commonly used heretofore, but those of the anionic type are also commonly used at present. Thus, for acid regions, a compound of

is used and for basic regions, that of

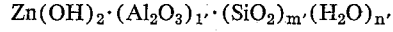

used. For neutral regions, an aqueous solution of a neutral salt, e.g. an aqueous potassium chloride solution, and ammonium phosphate-doped ice are used.

In order for the connection of the above-mentioned three regions, the following procedures are preferred: that is, a boundary layer consisting of a porcelain plate with fine holes is provided at a part of the wall of each of vessels made from an insulating material; individually different constituents are placed in each of the vessels so as to provide individually different regions; and then these vessels are intimately contacted at individual porcelain plates. FIG. 1 and FIG. 2 show one example of a vessel 11. Therein, for example, at both opening parts of a hard polyvinyl chloride-made cylindrical body 12 porcelain boundary disc plates 13 and 14 are closely fixed. If the spherical particles of an ion exchanger are used as the constituent for region, such particles are packed into a cavity 15 and the vacant space remained is filled with highly viscous silicone oil to effect complete air-tightening. Alternatively, the ion exchangeable particles are bonded with polyvinyl chloride containing dioctyl phthalate plasticizer to form a homogeneous plate mass which is then inserted into the cavity 15. Generally speaking, if a particulate material is used, it is preferable to bond such particulate material with an insulative, water- or alcohol-insoluble bonding agent before the use of said material. When it is intended to use the crosslinked polymer of the aforesaid styrene sulfonic acid, etc., such polymer may be formed into plates instead of the granulation of such polymer in the step of crosslinking. If the constituent for region is an acid or base as liquid high molecular electrolyte, an electrolyte layer may be floated on an aqueous layer by utilization of the difference in specific gravity.

Hereinafter, a vessel of the type shown in FIG. 1 and FIG. 2 will be referred to as a cell. FIG. 3 shows one embodiment wherein two cells, one 11 of which is filled with a granular acid region constituent 16 and the other 11' of which with a granular basic region constituent 17 are connected through boundary layers 14, 13' individually being a porcelain disc plate. Outside each of the cells 11, 11', caps 18, 19 individually are fixed air-tightly, and within these cells, disc electrodes 20, 21 are placed. In the cavity 22, an acidic solution is filled and in that 23, a basic solution filled. In this case, any energy barrier is not placed between any one of the electrodes and each of the regions. In order to impress an electric field to the resulting junction, both of the electrodes 20, 21 are individually connected to a resistor 25 in an electric power circuit 24 constructed by potentiometer method. When connecting direct or alternative electric power source to electric power source terminals 26, 27, self-exciting oscillation takes place through chemical reaction generated between both regions of the cell 11 and that 11'. The output is taken up between the terminals of the resistor 28 of the external circuit. In the present invention, an oscillating device comprising a complexed junction in the presence of an external electric field may be provided by connecting any number of sets of junctions in series, one set of the junctions consisting of an acid region and a base region.

The most important factor for the present invention is that in the acid region, substantially all of the electric current carriers are proton bearing very few of negative ion carriers such as a hydroxyl ion or an alkoxy ion, whilst in the basic region substantially all of electric current carriers are negative ion, such as hydroxyl or alkoxy ion which is kept to have more or, if any, few protons. These states are respectively expressed as proton excessive area formed by doped with proton donor and proton deficient area formed by doped with proton acceptor. By usual ion-exchange phenomenon, not only positive ions but also negative one are passable through the acidic region. Thus, since a large amount of hydroxyl ions other than proton passes through, non-linear performance (namely, rectification performance) can not be obtained and oscillation also does not occur. This is the greatest difference between the present invention and the usual ion exchange phenomenon.

In FIG. 4 which shows another example of the present invention, the acidic region Ac and basic region Bs, which individually are a filled cell made of an insulating material, are interposed between material, are interposed between any two of other cells $a$, $b$ and $c$. The cells $a$, $b$ and $c$ are made of hard polyvinyl chloride and they are provided with electrodes $Ea$, $Eb$ and $Ec$, respectively.

Now an explanation will be given with reference to what combination allows oscillation when any of the acid, basic and neutral regions are connected. To the cell $a$, an acidic solution (e.g. 1 mol./l. HCl aq. soln.) is charged, and to the cell $b$, a basic solution (e.g. 1 mol./l. KOH aq. soln.) charged, and to the cell $c$, pure water charged. An external circuit is connected as shown in this figure, wherein $Da$, $Db$, $Dc$ mean direct electric power sources; $r_a$, $r_b$, $r_c$ mean 100 KΩ variable resistors; $Ra$, $Rb$ represent compensating resistors; $r'_a$, $r'_b$ represent stabilizing resistors, μA represents micro-ammeter; and $O_a$, $O_b$ represent oscillation output terminals. In the circuit thus connected, electric current and electric voltage between the electrodes $Ea$-$Ec$, those $Ec$-$Eb$ and those $Ea$-$Eb$ are individually measured and plotted on coordinate axes to show the rectification performance as shown in FIG. 5. Forward direction is defined as $Ea \rightarrow Ec \rightarrow Eb$ and backward direction defined as $Eb \rightarrow Ec \rightarrow Ea$. It may be assumed that electroconductivity of water depends on the association reaction of water of the boundary layer in the forward direction as well as the dissociation reaction of same in the backward direction, there is a great difference in reaction velocity and therefore the rectification performance can be realized. In an exemplified device wherein $Ac$ is a region of the methacrylic acid type and $Bs$ is that of the methyl ammonium hydroxide type, the rectification performance between the electrodes $Ea$-$Eb$ is measured with the result:

Resistance in forward direction _____ $6 \times 10^3$
Resistance in counter direction _____ $1 \times 10^6$ provided that the distance between $Ea$-$Ec$ is 25 mm., the crossed sectional area of the cell is 1 cm.$^2$ and the thickness of each region is 2 mm.

By charging an electrolyte solution into the cell $c$ in a device of FIG. 4 and applying an electric field in the counter direction against the rectification performance, oscillation is caused to occur, and this permits deriving oscillation electric current from output terminals $Oa$, $Ob$. The oscillation, which takes place by the external application of direct current but not of alternative current, apparently is self-exciting oscillation, and the oscillation output electric current derived shows relaxation oscillation as seen in FIG. 6. The characteristics of such output wave, e.g. peak value $h$, width $w$, repeating period (or reciprocal of frequency) $Ts$, etc., can be determined depending upon the species and concentration of the solution in the cell $c$, the strength of the external electric field, temperature and pressure.

If not using the terminal of the electrode $Eb$ but using the terminals of the electrodes $Ea \leftarrow Ec$, relaxation oscillation characteristic for positive ion can be obtained at the terminal $Oa$, and on the contrary, if not using the electrode $Ea$ but using the electrodes $Ec$, $Eb$, that characteristic for negative ion can be obtained at the terminal $Ob$. If using only the electrodes $Ea$, $Eb$, without the electrode $Ec$, oscillation output currents which are characteristic for both positive and negative ions simultaneously appear in the circuit concerned.

In accordance with the present invention, thus, oscillation output can be provided not only by the combination of an acid region with a basic region, but also by the combination of an acid or basic region with a neutral region. In addition, as seen in FIG. 4, a complexed junction comprising any number of sets of the acid, basic and neutral regions in series also can provide oscillation.

In case of using a non-electrolyte alone, oscillation does not occur, but if both of an electrolyte and a non-electrolyte coexist in the solution in cell $c$, oscillation can take place. For example, the oscillation output derived from a solution containing potassium ion $K^+$ has a wave form seen in FIG. 6, but if a non-electrolyte coexists there, the oscillation output is modulated to an extent depending on the species and concentration of the said non-electrolyte, whereby the wave form obtained is as seen in FIG. 7.

In an acidic solution in the cell $c$, oscillation does not occur between the electrodes $Ea$-$Ec$ but it occurs between the electrodes $Ec$-$Eb$. On the contrary, in a basic solution, e.g. 1/100 mol/l. potassium hydroxide aq. soln., oscillation does not occur between the electrodes $Ec$-$Eb$, but occurs between the electrodes $Ea$-$Eb$.

As to the structure of a solution or as to the nature of hydrogen bonds, particularly those between the liquid molecules of the different species, we have only poor knowledge, and so precise explanation in regard to the oscillation mechanism of the present invention can not be given at this stage. Even the conductivity of an apparently very simple material, for example water, has been detailed first a very few years ago. For instance, in Conway, Bockris and Linton Journal of Chemical Physics, vol. 24, page 834 (1956) it has been disclosed that there may be assumed a process wherein proton $H^+$ effects energy barrier- and tunneling-transfer through hydrogen bonds between hydronium ion $H_3O^+$ and water molecule $H_2O$ and that wherein water molecule adjacent to $H_3O^+$ ion rotates to newly form a hydrogen bond which will accept proton $H^+$, and that in case of water, the rate-determining step is rotation of water molecule and in case of ice, such step is tunneling transfer of proton. This epoch-making theory still leaves the considerable difference between theoretical value and experimental value unsolved. Such situation obviously is derived from the mechanism of a solution system which is more complicated in nature than that of a semi-conductor. Further, theoretical interpretation about oscillation phenomenon of the invention may be more complicated than that about conductivity of pure water, because hydrogen bond is formed between the individual negative elements of molecules of the different species and a high molecular electrolyte of itself is not certain in its exact structure.

With respect to the principle of the present invention, however, some explanation will be given in connection with the above-said theory. For doing this, the same device as in FIG. 4 will be referred to, where an acid region $Ac$ is filled with an acid region constituent comprising a carboxylic high molecular acid and water, and cells $a$ and $c$ are filled with pure water.

When pure water $H_2O$ in the cell $c$ is junctured to the $Ac$ region, hydronium ion $H_3O^+$ which reaches a boundary layer by the action of an electric field forms a hydrogen bond with carboxylic acid, while proton $H^+$ is transferred to $Ac$ region. In the $Ac$ region and in the cell $a$, the concentration of the acid is high and electric current is carried with proton mainly. Because of the markedly high concentration of the proton, the electric current passing through the boundary layer depends upon the ionization reaction of water within the cell $c$. This ionization reaction is such that proton is struck out from the hydration shell of hydrated hydronium ion $H_3O^+(H_2O)_4$. If in the cell $c$ a suitable electrolyte is present and the cation, e.g. potassium ion $K^+$, is capable of passing to the $Ac$ region by the action of an electric field, hydrated potassium ion $K^+(H_2O)_4$ can have proton tunneling-transferred from the water molecule of the said hydrated ion through a hydrogen bond formed between the said ion and the oxygen atom of either carboxylic acid or water molecule in the $Ac$ region. Tunneling transfer velocity in this case is markedly greater than that in case of hydronium ion and consequently electric current increases.

Thus the hydration shell of $K^+(H_2O)_4$ is destructed to form $KOH(H_2O)_3$ (or sometimes $KOH(H_2O)_2$). In this state, however, electric current decreases because it is impossible to supply proton to the $Ac$ region. From the shell of $KOH(H_2O)_3$ proton is supplied again to reform the hydrated potassium ion $K^+(H_2O)_4$. Thus, destruction and reformation of the hydration shell are repeated, (even while proton is supplied again, recoordination of water molecule around potassium ion $K^+$ is effected, but a number of protons transferred during this period is a very few and electric current is very small.) Thus, oscillation current as shown in FIG. 6 is generated. The peak value, width and period of this pulse maximum current will, of course, depend upon the height and width of an energy barrier of the hydrogen bond at a boundary layer and those of an energy barrier of the hydrogen bond around cations, as well as rotation speed of water molecule and proton concentration, etc. Dissipation of protons from a variety of hydration shell can be compared in the energy of hydration to various ions:

| | Hydration energy Kcal. mole$^{-1}$ | No. of H$_2$O molecules (Hydration number) |
|---|---|---|
| H$_3$O$^+$ | 270 | 4 |
| K$^+$ | 77 | 4 |
| Li$^+$ | 131 | 4 |
| NH$_4^+$ | 87 | |
| OH$^-$ | 120 | 6 |
| F$^-$ | 94 | |
| Br$^-$ | 63 | |
| Cl$^-$ | 115 | 8 |

For the ionization of proton from a hydration shell with a high hydration energy level, a great energy is required, and the value of dissociation energy D$o$ is equal to the value shown in the above table.

Hydration energy of high molecular carboxylic acid in the A$c$ region may be about 13.6 Kcal./mole, and in this case it is apparent that proton is easily transferred from the acid site to the cell $c$ (in the forward direction) whereby a great electric current flows with a very little resistance. In the counter direction, where proton passes from K$^+$(H$_2$O)$_4$ to the A$c$ site, an energy barrier is lowered and an electric current increases. This means that an electric current decreases at the stage of K$^+$(H$_2$O)$_n$ $n<4$ when reformation of the hydration shell is a ratio-determining step.

The situation is similar in the case where an aqueous solution is junctured at both sides of a basic region, provided that a basic solution, e.g. 5 mol/l. KOH aq. solution, is provided at one side so as not to have an energy barrier with respect to hydronium ion between the electrode and the basic region and aqueous solution containing a variety of negative ions is junctured at the other side. When using polystyrene trimethyl ammonium hydroxide as base, the hydroxyl ion which connects to the active group is a charge carrier concerning the transfer, and there is none-or a very few of protons which take a part in the transfer. If chlorine ion for example is present in an aqueous solution, hydrated chlorine ion dissipates at the boundary layer hydroxyl ion from the hydration shell into the basic region, whereby HCl(H$_2$O)$_7$ (generally Cl$^-$(H$_2$O)$_m$, HCl(H$_2$O)$_n$, $n<m$) temporarily forms which does not allow to dissipate hydroxyl ion until the hydration shell is reformed. Through the recurrence of this phenomenon, pulse oscillation current similarly flows through the boundary layer as in the acid region. The recurrent generation of transient maximum electric current as explained above may be considered as the apparent negative resistance. In other words, it may be said that the nonlinear performance as shown in FIG. 8 is realized in relation between the strength of the external electrical field $\nabla \varphi x$ and the electric current I. In the case of FIG. 8, oscillation is effected through a limit cycle of $p \rightarrow q \rightarrow s \rightarrow r$, but the generation of such negative resistance also accompanies that of an equivalent reactance and in this regard it is somewhat different from the negative resistance of vacuum tubes or semi-conductors heretofore known. That is, an oscillating device of the present invention can provide oscillation without a reactor particularly connected.

The discussion which is given in the preceding paragraph is made with reference to the case where a number of water molecules which connect with the active group in each of the regions is very small so that potassium ion and chlorine ion can not come into any of the regions. But when a number of water molecules increases, solute ion alike potassium ion will be able to get into the regions. Even in this case, however, unless water molecules are not present in the regions beyond a proper number defined depending upon the type of ions, the aforesaid reaction will be repeated between the active group in the region and the ion from the external source whereby self-exciting oscillation generates. The electrolyte ions in the cell $c$ (FIG. 4) will move in each of the regions in the follow direction (said ions being cation) or in the counter direction (said ions being anion) by diffusion. If a number of water molecules is further increased, a selective permeability that is the proportion of permeated H$^+$ or other cation to OH$^-$ decrease, until the said oscillation diminishes, and instead of the oscillation, simple ion exchange reaction occurs.

In the above-mentioned regions, the constituent of the acid or basic region is the association product of an acid or basic compound and water at the suitable mole ratio. Instead of water molecules, methanol or ethanol molecules can be used to have the association between such alcohol and an acid or base through which oscillation similarly occurs. This result is naturally expected from the fact that the dissociation and transfer of alcohol molecules are very similar to those of water molecules. However, the concentration or mobility of proton in alcohols somewhat will vary depending on the chemical structure of the alcohols, and the wave form of oscillation will vary in response to varying dissociation constant of an electrolyte in the alcohols.

Whilst it is considered that in alcohol H$_2$OR$^+$ but not H$_3$O$^+$ is present (R means alkyl radical), there is no confirmation whether OR$^-$ is present or not instead of OH$^-$. The transfer of hydroxyl ion OH$^-$ in the basic region is based on the acceptation and donation of proton H$^+$ as shown by the following formula

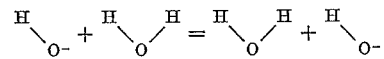

and so it may be permissible to assume the presence of RO$^-$. It is similar to negative holes in semi-conductors.

The above-mentioned acid, basic and neutral regions usually are in a liquid state or in an intermediate state between liquid and solid, but the present invention can be accomplished by converting these regions into solid state at room temperature or low temperatures and then connecting these solid regions.

In H$_2$O-ice system tunneling transfer of H$^+$ shows a rate determining step, but in acid-doped proton excessive ice system, rotational transfer due to rotation of H$_2$O molecule shows rate determining step. But such difference is not such a severe disadvantage against oscillation. When ice of the proton excess type, obtained by doping a suitable inorganic or organic acid into ice, and that of the proton decess type, obtained by doping the corresponding base into ice, are connected directly or through ice having been doped with a suitable electrolyte ion, thereby to provide boundary layers in a suitable form and then an electric field is impressed thereto with non-barrier electrodes individually attached to the excess region and the decess region, self-exciting oscillation can take place. At the connected surfaces hydrogen bonds must be formed continuously, but this can be easily done by controlling temperatures therein and by circulating electric current therethrough. For example, the purpose of the present invention can be effected by connecting the acid region of acetic acid-doped ice and the basic region of ethyl amine-doped ice through ammonium phosphate-doped ice interposed therebetween. The concentration of proton donor or proton acceptor in each of the regions varies depending upon its molecular weight, dimensional molecular size and chemical structure, but it may be about 8 mole/l. as to acetic acid and about 7 mole/l. as to ethyl amine. Of course, somewhat debiated concentration is allowable, but the non-linear performance and consequently oscillation wave somewhat change. As to the concentration in the boundary region, its low value is allowable.

Generally speaking, an acid is proton donor which can provide free proton when associated with water, alcohols, aldehydes, etc., and on the other hand, a base is proton acceptor. In these points, the acid and base are alike electron donor and electron acceptor respectively in semi-conductors. While the carrier in semi-conductors is electron, that of the present invention is proton, and there is a fundamental difference between an oscillating device of the present invention and a semi-conductor oscillating device in the prior art.

As typical solids which are capable of oscillating when junctured, hydrates also can be referred to. There are known many number of hydrates of condensed acids, namely inorganic polyacids. For example, phosphomolybdic acid hydrate, and the hydrates of silico- or boro-tungstic acid or of molybdic acid are referred. In the crystal structure of these hydrates, hydronium ion $H_3O^+$ is present, the strength of this $H_3O^+$ ion being determined depending on the type and number of group or ion concerned and the number of water molecules concerned, and if such solid is connected with a basic or neutral region in the above-specified manner, oscillation can take place. These hydrates are equivalent in principle to the solid junctions as discussed above, but they are different only in that some of the hydrates will suffer from temporary destruction of their crystalline structure. With respect to other crystals including the hydrates of various acids and bases, the similar situation can be expected.

Now discussion will be made with reference to the case where amphoteric electrolytes are used as the constituent for regions. Such electrolytes contain both of acidically dissociating active group and basically dissociating active group in one molecule. This is equivalent to the fact that an acid region and a base region are junctured at the distance of several angstroms, and therefore oscillation can take place due to the bonding with $H_2O$ molecule and the distribution of hydrated electrolyte ion.

A typical example showing the distribution of hydrate is ice which has been doped with amino acid, e.g. lysine or cystine, in combination with cation, e.g. ammonium ion, or anion, e.g. phosphate or sulfate ion. In any case of using amphoteric electrolytes, because of the periodical arrangement of both regions and boundary layers at a very short distance, the frequency number of oscillation is very high and it is possible to effect oscillation with a weak external electric field per unit junction. If the external electric field is alternative current, resonance of the frequency of self-exciting oscillation $\omega_s$ and that of external alternative current $\omega_x$ takes place, and therefore it is possible to take up the frequency of co-oscillation $\omega_s$.

With respect to the electrodes for regions, the following care should be taken. When using a solution in a region, the electrode is placed in a solution vessel which is provided in contact with the region. In this case, it is necessary to avoid the formation of an energy barrier between the electrode and each of the regions. For this purpose, it is recommended to use a highly concentrated solution, e.g. HCl or KOH soln., in the solution vessel. For providing an electrode within a solid region, a hydrogen occlusion electrode, wherein hydrogen has been adsorbed on platinum-platinum black, zirconium, titanium, etc., is contacted as proton-reversible electrode with the solid region. Unless otherwise, for example when a neutral solution is charged in the solution vessel for the electrode, there is formed an energy barrier between the solution region and the acid or base region to inhibit the transfer of proton or hydroxyl-ion or alkoxyl-ion. Even in this state, however, self-exciting oscillation can be effected, but oscillation wave may be affected more or less. When an irreversible electrode, e.g. platinum or other metal electrode, is directly contacted to the solid region, the part around the negative electrode becomes basic and that around the positive electrode goes acidic due to the electrode reactions. Because of this reason, the wave form of oscillation sometimes is greatly influenced. That is to say, a new acidic or basic region forms in addition to the previously designated acidic and basic regions. This phenomenon is of the convenience if it is intended to have oscillation due to ion transfer and electrode reaction, because it readily occurs when an electrode is contacted directly to either one of the acid region and basic region and then an electric current is put into circulation through the circuit.

In one example, a direct current is passed by means of a silver electrode into an acid region comprising acetic acid- and ammonium phosphate- or ammonium chloride-doped ice, so as to form a basic region at the part around a negative electrode. By controlling temperatures, the junction of these two regions is stabilized. If an electric field is applied to the junction in the counter direction (from basic site to acidic site), oscillation occurs.

The thickness and cross sectional area of each of the regions and the distance of such regions from electrodes are not necessary to be uniform, and these may be varied if needed. If the thickness of each region is increased, the strength of an external electrical field per unit length decreases and the oscillation output also decreases. The shape of each region and electrode can be varied to obtain desired oscillation wave.

Now the relation between electrolyte ion distribution and oscillation will be mentioned with reference to the following examples.

Example 1.—Junction of an acid region and a neutral region respectively using strong acid and water.

The acid region constituent used is a solution, with a concentration of about 4 mol./l., obtained by doping in water polystyrene sulfonic acid relatively highly cross-linked with divinyl benzene. This constituent is charged in a middle cell, a cell at one side is filled with an aqueous solution containing $K^+$, $Li^+$ or $Bg^{++}$ as the sample for neutral region, and it is provided with a positive electrode. A cell at the other side is filled with hydrochloric acid and provided with platinum electrode as negative. The sample for neutral region is an aqueous solution of KCl, LiCl or $MgSO_4$, with any concentration of 1/10, 1/100 and 1/1000 mole/l. The oscillation is effected at the intensiveness of an electric field of 5 volt/cm. Peak value $h$, width $w$ and oscillation interval $Ts$ of the oscillation pulse are set forth in the following table.

|           | Conc. (mol/l.) | $h$ (mV) | $w$ (m. sec.) | $Ts$ (m. sec.) |
|-----------|----------------|----------|---------------|----------------|
| $K^+$     | 1/10           | 80       | 4             | 150            |
|           | 1/100          | 40       | 8             | 150            |
|           | 1/1000         | 20       | 16            | 150            |
| $Li^+$    | 1/10           | 50       | 4             | 60             |
|           | 1/100          | 25       | 8             | 60             |
|           | 1/1000         | 12.5     | 16            | 60             |
| $Mg^{++}$ | 1/10           | 30       | 0.5           | 5              |
|           | 1/100          | 15       | 1.0           | 5              |
|           | 1/1000         | 8        | 1.8           | 5              |

Example 2.—Junction of an acidic region and a neutral region respectively using a weak acid and water.

The same apparatus and procedures as in Example 1 are employed but excepting that the acid region used is a solution, with a concentration of about 8 mole/l., obtained by doping in water polymethacrylic acid having been cross-linked with divinyl-benzene. The results are set forth in the following table.

|           | Conc. (mol/l.) | $h$ (mV) | $w$ (m. sec.) | $Ts$ (m. sec.) |
|-----------|----------------|----------|---------------|----------------|
| $K^+$     | 1/10           | 50       | 2             | 60             |
|           | 1/100          | 25       | 4             | 60             |
|           | 1/1000         | 12       | 8             | 60             |
| $Li^+$    | 1/10           | 30       | 2             | 40             |
|           | 1/100          | 15       | 4             | 40             |
|           | 1/1000         | 8        | 8             | 40             |
| $Mg^{++}$ | 1/10           | 10       | 0.1           | 1              |
|           | 1/100          | 5        | 0.2           | 1              |
|           | 1/1000         | 2.5      | 0.4           | 1              |

*Example 3.*—Junction of a basic region and a neutral region respectively using a strong base and water.

The base region constituent used is a solution, with a concentration of about 4 mol./l., obtained by doping in water polystyrene trimethyl ammonium hydroxide having been crosslinked with divinyl-benzene. This constituent is charged in a middle cell. A cell at one side of the middle cell is filled with an aqueous solution containing $Cl^-$, $SO_4^{--}$ or $PO_4^{---}$ as sample for neutral region and it is provided with a negative electrode. A cell at the other side of the middle cell is filled with an aqueous potassium hydroxide solution and provided with a positive electrode. The sample for neutral region is an aqueous solution containing KCl, $MgSO_4$ or $(NH_4)_3PO_4$ at any concentration of 1/10, 1/100 and 1/1000 mole/l. The electrical field applied is 6 volt/cm. The results of oscillating pulse are shown in the following table:

|  | Conc. (mol/l.) | h (mV) | w (m. sec.) | Ts (m. sec.) |
|---|---|---|---|---|
| $Cl^-$ | $10^{-1}$ | 60 | 4 | 100 |
|  | $10^{-2}$ | 30 | 8 | 100 |
|  | $10^{-3}$ | 15 | 16 | 100 |
| $SO_4^{--}$ | $10^{-1}$ | 20 | 2 | 10 |
|  | $10^{-2}$ | 10 | 4 | 10 |
|  | $10^{-3}$ | 5 | 8 | 10 |
| $PO_4^{---}$ | 1/10 | 8 | 0.5 | 4 |
|  | 1/100 | 4 | 1.0 | 4 |
|  | 1/1000 | 2 | 2.0 | 4 |

*Example 4.*—Junction of a basic region and a neutral region respectively using a weak base and water.

The same apparatus and procedures as in Example 3 are taken but excepting that the basic region used is a solution, with a molar concentration of about 7 mole/l., obtained by doping in water polystyrene polyamine having been crosslinked with divinyl benzene and that the electric field applied is 10 volt/cm. The results are shown in the following table.

|  | Conc. (mol/l.) | h (mV) | w (m. sec.) | Ts (m. sec.) |
|---|---|---|---|---|
| Cl | 1/10 | 80 | 2 | 40 |
|  | 1/100 | 40 | 4 | 40 |
|  | 1/1000 | 20 | 8 | 40 |
| $SO_4^{--}$ | 1/10 | 30 | 1 | 6 |
|  | 1/100 | 15 | 2 | 6 |
|  | 1/1000 | 7 | 4 | 6 |
| $PO_4^{---}$ | 1/10 | 10 | 0.1 | 1 |
|  | 1/100 | 5 | 0.2 | 1 |
|  | 1/1000 | 2.5 | 0.4 | 1 |

*Example 5.*—Junction of an acid region and a neutral region respectively using a strong acid and an alcohol.

The same apparatus and procedures as in Example 1 are employed but excepting that the acid region is a solution, with a concentration of about 4 mol./l., obtained by doping in ethanol polymethacrylic acid having been crosslinked with divinyl benzene and the neutral region used is an ethanol solution of KCl or $(NH_4)_3PO_4$. The electrical field applied is 10 volt/cm. The results are set forth in the following table.

|  | N | h (mV) | w (m. sec.) | Ts (m. sec.) |
|---|---|---|---|---|
| $K^+$ | Saturated | 4 | 30 | 3,000 |
| $NH_4^+$ | do | 2 | 50 | 2,000 |

*Example 6.*—Junction of a basic region and a neutral region respectively using a strong base and an alcohol.

The same apparatus and procedures as in Example 3 are employed but excepting that the basic region used is a solution, with a concentration of about 8 mol./l., obtained by doping normal dodecenyl trialkyl methyl amine into a mixture of butanol and ethanol (5:20 by weight) and the neutral region used is an ethanolic solution of KCl and $CH_3COOH$. Oscillation is effected at the strength of an electrical field of 10 volt/cm.

The oscillation wave of the present invention is subjected to a frequency analyzer to determine the distribution of intensities, and the relationship between frequency numbers of the components and individual intensities is readily found.

FIG. 9 shows the frequency intensity-distribution with reference to the afore-mentioned oscillation of Example 1. On the lateral axis, the logarithmic value of frequency number $f$ is plotted, and on the longitudinal axis, intensity is plotted on the reduced scale. The peak and width of the peaks can be decreased or increased depending upon the relative concentration (or precisely activity) of each $K^+$, $Li^+$ and $Mg^{++}$ ions, and therefore, if a standard solution containing known components at their known concentrations is predetermined, qualitative and quantitative tests can be carried out with reference to the said standard solution. Such relation is similar to that in the known analytical methods, e.g. visible and infra-red absorption spectrum analysis.

With respect to a non-electrolytic component, e.g. sugars, it is impossible to determine the spectrum position or distribution of the component per se, but it is possible to determine the species and concentration of the component in relation to ion spectrum. For example, if sugar is added to such which has the distribution of FIG. 9 due to the presence of potassium and magnesium ions, each of the peaks in the spectrum attenuates to a low value, the degree of this attenuation being in a specific relation to the concentration of sugar.

Depending on the molecular structure of a non-electrolyte, the spectrum of a particular ion is selectively suppressed. For example, in the oscillation caused by chlorine ion and acetic acid ion, the curve of the spectrum attenuates with decrease in peak and width in response to the increase in glycerine concentration, whereas the spectrum of acetic acid ion rapidly diminishes in response to the increase in fructose concentration. When employing water molecules as medium, the above-mentioned phenomena are due to chemical bonds between water molecule and various ions, hydrogen bonds between nonionic molecule and water molecule, change in viscousstress and in relative ionic strength. However, similarly as in visible and infra-red absorption spectrum, the quantities and types of dissolved components can be determined through the spectrum intensity measurement by the aid of alcohol as medium.

Another analytical method comprises introducing oscillation wave through an electric filter circuit to a counting circuit thereby to directly count the pulses of a particular ion.

In accordance with the present invention, a frequency number of repeated oscillation is proper to the species of an ion concerned. Accordingly if previously standardizing the spectrum distribution under selected oscillation conditions, e.g. chemical and geometrical structure of individual regions, electric field strength, temperature and pressure, etc., it is possible to have identification of the species of the ion. Detection and analysis can be effected in connection with a binary or more higher mixture. FIG. 10 shows the wave form of a binary system. With respect to a non-electrolyte solution, the similar analysis as above can be effected by utilizing the oscillation phenomena of Example 7 in the presence of potassium ion. With respect to a non-electrolyte, such as sugar, the influence of viscosity as well as hydrogen bond develops greatly, but in this case too, quantitative and qualitative analysis can be made with reference to the standard solution previously examined.

Analytical precision of a binary system is an error of ±0.5% and that of a five component-containing system is an error of ±3%. Other features of an oscillating device of the present invention is that the resulting output signal is in the form of pulse and so it can be counted by means of a counting machine.

Particularly if it is intended to avoid the influence of an electrode reaction, an external electric field which is impressed to excite oscillation should not be direct current but alternating current. When the frequency number $\omega_x$ of external alternative current is continuously changed in relation to the inherent frequency number $\omega_s$ of junction between regions, intense resonance takes place at the point in which $\omega_x$ is equal to $\omega_s$, and large resonant pulse output can be obtained.

In accordance with the present invention, oscillation can be effected without any external power source, by connecting an acid region $A_c$ and a basic region $B_s$ in the alternate manner ($A_c$–$B_s$–$A_c$–$B_s$) and then disposing lead, lead oxide, zinc, tin or a commonly known electrode and a solution, e.g. sulfuric acid, or iron, so as to effect sufficient accumulation of counter electromotive force due to polarization.

FIG. 11 serves to explain an oscillating device of the self-contained power source type. For example, the numerals 29, 30 are acid regions $A_c$, and therebetween, a basic region $B_s$ 31 is inserted interposed with boundary layers 32, 33. Further, the solution vessels 36, 37 in each of which electrodes 34 and 35 are placed are provided. From an external power source, an electric current is circulated in the direction of X→Y, thereby to effect polarization through reaction between electrodes and the solutions therearound. This is similar construction to that of lead battery, mercury cell and alkali cell. The system thus constructed is connected to the external load 38, and thereby self-exciting oscillation current flows through this circuit according to the aforementioned principle. Within the device in this case apparently there are a boundary layer concerning oscillation and that not concerning oscillation. That is, oscillation does not occur in the direction of $A_c$→$B_s$, but occurs in the direction of $B_s$→$A_c$ only.

In one concrete embodiment, the constituent for acid regions 29, 30 is the association product of polystyrene sulfonic acid and water molecule, and the constituent for basic region 31 is the association product of polystyrene trimethyl amine and water molecule. To a boundary layer, 2 mol./l magnesium sulfate is charged, and to both electrode solution vessels 36, 37 $H_2SO_4$ is filled. Electrode 34 is spongy lead and electrode 35 is lead oxide $PbO_2$. In the system, an electromotive force between X–Y is stably maintained at about 1.5–2 volt and relaxation oscillation generates with a frequency of 150 cycles.

An alkali battery can be arranged too. In FIG. 11 for example, the constituent for basic regions 29, 30 is the association product of polystyrene sulfonic acid and water molecule, and the constituent for an acid region 31 is the association product of polystyrene trimethyl amine and water molecule. Both electrode solution vessels 36, 37 are filled with 4 mol./l KOH aqueous solution, negative electrode 34 is $Fe(OH)_2+Fe$, positive electrode 35 is $Fe+Ni(OH)_2$. The secondary cell thus designated can have self-exciting by the action of its own electromotive force.

While in an oscillating device of the present invention, explanation is given with reference to oscillation current, naturally the situation is same in the case of oscillation potential. Whether the oscillation output is taken up as oscillation current or as oscillation potential is only a problem required to determine the interior arrangement of the device and the external circuit design. In order to adjust the wave form of oscillation wave or in order to maintain the oscillation frequency constant, if necessary, coils, condensers or other reactor elements can be attached to the external circuit.

The characteristics of an electric oscillating circuit element of the present invention may be enumerated as follows:

I. *Advantages as oscillating device.* — In comparison with Dynatron oscillator or multivibrator which are known heretofore.

(1) An oscillating device of the present invention does not require any reactor element;

(2) It is simple in structure and it is easy to be manufactured in any desired size or shape for the purpose intended;

(3) It bears high load;

(4) It can be performed with minor heat and dielectric loss and at a high efficiency;

(5) It permits to control its oscillation performance easily;

(6) It is ready to provide a large output;

(7) It is suitable as means for the detection or control of pressure and temperature, because it can be connected so as to have the period or amplitude of the oscillation wave markedly changed in response to the minor change in temperature and pressure.

II. *Advantages as analytical means (or method).*—In comparison with the commonly known techniques, e.g. current titration means, potentiometric titration means, polarography, pH meter and chromatography, and in comparison with visible or infra-red absorption analysis, a device of the present invention which can be considered as digital method has the following advantages:

(1) Precision in measurement is high;

(2) Speedy measurement is possible;

(3) The device is simple in structure and it is easy handled;

(4) Precise and speedy measurement can be made even for a multi-component system containing a variety of cations, unions or non-electrolytes, such system being difficult to be analyzed by the known techniques.

What I claim is:

1. An electrochemical cell comprising in combination a cylindrical hollow body; porous disk plates closing both ends of said body to form a chamber; and ion exchange particles and high viscous silicon oil filling said chamber.

2. The cell of claim 1, wherein the ion exchange particles are bonded with polyvinyl chloride containing dioctyl phthlate plasticizer.

3. An electrochemical oscillator comprising in combination a pair of cells each consisting of a hollow cylindrical body portion closed at both ends by a porous member; one of said cells enclosing a granular acid constituent and the other of said cells enclosing a granular basic constituent; an air-tight container enclosing said cells in juxtaposition and providing chambers on opposite ends of the juxtaposed cells within the container; an electrode and an acidic solution disposed in the chamber adjacent the acid cell; a further electrode and a basic solution disposed in the chamber adjacent the basic cell; and means for impressing a voltage across said electrodes for establishing self-exciting oscillation through the cells.

4. The electrochemical oscillator of claim 3, wherein said last-mentioned means includes terminals for the application of potential; a potentiometer connected across said terminals; and electrical leads connected to said electrodes from said potentiometer; a resistor connected in one of said leads across which oscillation energy may be extracted from said cells.

5. An electrochemical device comprising in combination a plurality of cells in juxtaposed relation; each cell including a hollow cylindrical body portion and a porous closure member at each end thereof; a plurality of electrodes respectively disposed in alternate ones of said cells; an acidic and a basic material disposed in the cells between said alternate ones; the cell enclosing a first one of said electrodes adjacent to the acidic cell also including acidic material; the cell enclosing a third one of said electrodes disposed adjacent said basic cell and including a basic material; and the cell intermediate said acidic and basic cells including the second electrode also containing pure water whereby said device functions as a rectifier with the forward direction being from the first to the third electrode.

6. The electrochemical device of claim 5, adapted to produce oscillation, wherein said intermediate cell includes a neutral electrolyte and means for applying a direct electric field between said third and first electrodes of polarity to oppose rectification whereby oscillation is derived between said first and third electrodes.

7. The oscillator of claim 6, wherein the direct field is applied only between the first and second electrodes to produce oscillation thereacross.

8. The oscillator of claim 6, wherein the direct electric field is applied between the second and third electrodes to produce oscillation thereacross.

9. A self-powered electrochemical oscillator comprising in combination a plurality of cells in contiguous relation, the extreme end cells each including an electrode and an acid material; the cells in juxtaposition with said extreme cells each including an acid material and the cells contiguous to said acid material cells including a neutral electrolyte with the cell disposed therebetween including a basic material and a load resistor connected between said electrodes whereby self-excitation oscillation occurs to produce an oscillation potential across said load resistor.

10. The electrochemical oscillator of claim 9, arranged as an alkali battery wherein the acidic cells without the electrodes comprise basic material and the intermediate basic cell comprises acidic material whereby self-excitation oscillation is produced across said external load.

11. An electrochemical oscillation device comprising in combination an enclosure; at least one junction member separating the enclosure into at least two regions; a base material comprising means in each of said regions which is capable of forming a hydrogen bond; means comprising material in one of said regions to make it an acid region; means comprising material in the other of said regions to make it a basic region; means comprising a proton donor material in said acid region; and means comprising a proton acceptor material in said basic region.

12. The device of claim 11 further comprising at least a further junction member to establish at least a further region in said enclosure; means comprising material in said further region to make it a neutral region.

13. An electrochemical oscillator comprising in combination an enclosure; at least one junction member separating the enclosure into at least two regions; a base material in each of said regions capable of forming a hydrogen bond to enable electroconductance through the action of proton and proton defect carriers in the molecule of said material; means comprising a proton donor material included in said base material in one of said regions to form an acid region, means comprising a proton acceptor material included in said base material in the other of said regions to form a basic region; and means for applying an electric field across said enclosure to produce electrical oscillation thereacross.

14. The device of claim 13, wherein the proton donor is a compound, the cation of which has a greater mobility than that of the anion.

15. The device of claim 13, wherein the proton acceptor is a compound, the anion of which has a greater mobility than that of the cation.

16. The device of claim 13, wherein the proton donor is an inorganic hydrate.

17. The device of claim 13, wherein the base material is a neutral solution.

18. The device of claim 13, wherein the acid region and the base region comprise an amphoteric electrolyte means.

19. An electrochemical oscillation device comprising in combination an enclosure; at least one junction member separating the enclosure into at least two regions; said junction member characterized by some porosity; a base material included in each of said regions which is capable of forming a hydrogen bond, means comprising a proton donor material in one of said regions to make it an acid region; said proton donor material selected from the group consisting of cation exchange organic cross-linked polymers, organic acids, and organo substituted phosphorous acids; means comprising a proton acceptor material in the other of said regions to make it a basic region; and means for applying an electric field to said enclosure effective across said junction member to cause electrical oscillation thereacross.

References Cited by the Examiner

UNITED STATES PATENTS

| | | | |
|---|---|---|---|
| 1,473,883 | 11/1923 | Slepian | 317—231 |
| 2,702,272 | 2/1955 | Kasper | 317—231 X |
| 2,870,344 | 1/1959 | Brattain et al. | 317—233 |

JAMES D. KALLAM, *Acting Primary Examiner.*